(12) United States Patent
Kim et al.

(10) Patent No.: US 9,889,843 B2
(45) Date of Patent: Feb. 13, 2018

(54) APPARATUS AND METHOD FOR PREVENTING SHUT DOWN IN LIMPHOME DRIVING

(71) Applicant: Hyundai Motor Company, Seoul (KR)

(72) Inventors: Yong-Hyun Kim, Seoul (KR); Sang-Hwan Kim, Gyeonggi-do (KR); Tae-Jin Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/711,819

(22) Filed: May 14, 2015

(65) Prior Publication Data

US 2016/0121881 A1    May 5, 2016

(30) Foreign Application Priority Data

Nov. 4, 2014    (KR) ........................ 10-2014-0151987

(51) Int. Cl.
*B60W 10/02*    (2006.01)
*B60W 20/50*    (2016.01)
*B60W 10/06*    (2006.01)
*B60W 10/08*    (2006.01)
*B60K 6/485*    (2007.10)

(52) U.S. Cl.
CPC .............. *B60W 20/50* (2013.01); *B60K 6/485* (2013.01); *B60W 10/02* (2013.01); *B60W 10/06* (2013.01); *B60W 10/08* (2013.01); *B60W 2710/0627* (2013.01); *B60W 2710/0644* (2013.01);
(Continued)

(58) Field of Classification Search
CPC ...... B60W 20/50; B60W 10/08; B60W 10/30; B60W 10/06; B60W 10/02; B60W 2710/0616; B60W 2710/0644; B60W 2710/025; B60W 2710/021; B60W 2710/0627; Y10S 903/93; Y02T 10/7077;
(Continued)

(56) References Cited

U.S. PATENT DOCUMENTS

2011/0276213 A1    11/2011    Tomatsuri

FOREIGN PATENT DOCUMENTS

JP    2007-198159 A    8/2007
JP    2011-031659 A    2/2011
(Continued)

OTHER PUBLICATIONS

Machine translation of JP2011031659 into English, provided by EPO.*

*Primary Examiner* — Mussa A Shaawat
*Assistant Examiner* — Michael V Kerrigan
(74) *Attorney, Agent, or Firm* — Mintz Levin Cohn Ferris Glovsky and Popeo, P.C.; Peter F. Corless

(57) ABSTRACT

An apparatus and method for preventing a shut down in limphome driving are provided. The apparatus includes an engine clutch and a hybrid control unit (HCU) that is configured to operate a vehicle by dualizing a driving of the vehicle into a normal driving control and a limphome driving control. When the driving of the vehicle is in the limphome driving control, the HCU is configured to reduce a vehicle speed and perform a control right shift based on a status of the engine clutch. In addition, an engine control unit (ECU) is configured to compare a current engine revolution per minute (RPM) with a targeted engine RPM based on the control right shift to operate the engine to adjust the engine RPM to reach the targeted engine RPM.

13 Claims, 4 Drawing Sheets

(52) U.S. Cl.
CPC ........ *Y02T 10/6226* (2013.01); *Y02T 10/6286* (2013.01); *Y10S 903/93* (2013.01)

(58) Field of Classification Search
CPC .. Y02T 10/6221; Y02T 10/6286; B60K 6/485
See application file for complete search history.

(56) References Cited

FOREIGN PATENT DOCUMENTS

| | | |
|---|---|---|
| JP | 2012-112292 A | 6/2012 |
| JP | 2013-169917 A | 9/2013 |
| KR | 10-2011-0018742 A | 2/2011 |
| KR | 10-2012-0105393 A | 9/2012 |

* cited by examiner

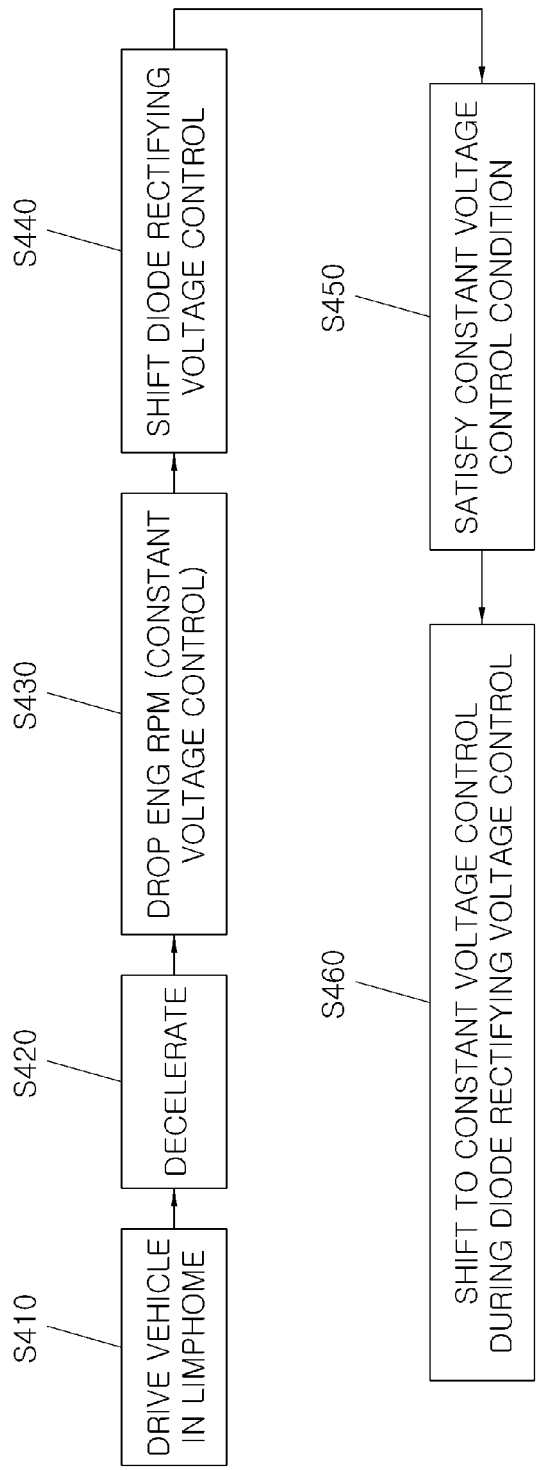

APPARATUS AND METHOD FOR PREVENTING SHUT DOWN IN LIMPHOME DRIVING

CROSS-REFERENCE(S) TO RELATED APPLICATION(S)

This application claims the benefit of priority to Korean Patent Application No(s). 10-2014-0151987 filed on Nov. 4, 2014, the entire contents of which are incorporated herein by reference.

BACKGROUND

Field of the Invention

The present invention relates to a technology of controlling an oil pump in a limp-home, and more particularly, to an apparatus and a method for preventing a shut down of a vehicle by allowing a high voltage oil pump to dualize a driving of a vehicle into normal driving and limp-home driving to prevent an engine revolutions per minute (RPM) from decreasing during the limp-home driving. Further, the present invention relates to an apparatus and a method for preventing a shut down of a vehicle by performing an interlocking control of a constant voltage control and a diode rectifying voltage control.

Description of Related Art

When a failure and/or an emergency situation of a controller occurs in a structure of a transmission mounted electric device (TMED) which is a parallel hybrid electric vehicle (HEV) scheme, the vehicle performs limp-home driving. In particular, the limp-home means a safe function of implementing minimum driving of a vehicle even when a problem of performance and a sensor operation arises. In other words, the limp-home is a state in which the vehicle is driven by an engine and a transmission while stopping the use of a motor and a hybrid starter generator (HSG) when power of a battery is cut off.

Generally, to generate an oil pressure in the HEV, an oil pump unit (OPU) (generally, use a power supply of 12 V) and a mechanical oil pump (MOP) are controlled to drive an oil pump. However, some of the HEVs adopt a high voltage OPU which is driven at 270 V, a normal voltage, and has a minimum driving possible voltage of about 80 V or greater.

Generally, even though a supply of power of the high voltage battery is cut off during limp-home driving, the vehicle may generate the oil pressure and the driving by using the power supply of 12 V and the MOP. However, some of the vehicles may not generate the oil pressure without the high voltage battery and thus may not be driven. Further, even though some of the vehicles generate the oil pressure without the high voltage battery, the engine revolution per minute (e.g., engine RPM) may be changed while driving. In addition, the engine RPM decreased based on various driving situations and thus a lowest voltage of the OPU may not be consistently maintained. Therefore, a need exists for a technology of preventing a shut down of a vehicle by preventing the engine RPM from decreasing during the diode rectifying voltage control and the constant voltage control in the limp-home driving.

SUMMARY

An exemplary embodiment of the present invention is directed to an apparatus and a method for preventing a shut down of a vehicle by allowing a high voltage oil pump to dualize a driving of a vehicle into normal driving and limp-home driving to prevent an engine RPM from decreasing during the limp-home driving.

Another exemplary embodiment of the present invention is directed to an apparatus and a method for preventing a shut down of a vehicle by performing an interlocking control of a constant voltage control and a diode rectifying voltage control.

Other objects and advantages of the present invention can be understood by the following description, and become apparent with reference to the exemplary embodiments of the present invention. Additionally, it is obvious to those skilled in the art to which the present invention pertains that the objects and advantages of the present invention can be realized by the means as claimed and combinations thereof.

An aspect of the present invention provides an apparatus for preventing a shut down of a vehicle by preventing an engine RPM from decreasing during limp-home driving by allowing a high voltage oil pump to dualize a driving of a vehicle into normal driving and limp-home driving.

In accordance with an exemplary embodiment of the present invention, an apparatus for preventing a shut down in limp-home driving may include: an engine clutch; a hybrid control unit (HCU) configured to operate a vehicle by dualizing a driving of the vehicle into a normal driving control and a limp-home driving control and when the driving of the vehicle is in the limp-home driving control, decelerate a vehicle speed and perform a control right shift based on a status of the engine clutch; and an engine control unit (ECU) configured to compare a current engine revolution per minute (RPM) with a targeted engine RPM based on the control right shift to operate the engine to adjust the engine RPM to reach the targeted engine RPM.

The status of the engine clutch may be in an open status or a slip status. The targeted engine RPM may be a value designated by the HCU. The ECU may increase the current engine RPM by fuel injection when the current engine RPM is less than the targeted engine RPM. The HCU may be configured to increase an open timing of the engine clutch based on an increase in the current engine RPM. In addition, the targeted engine RPM may be an engine idle RPM and the engine idle RPM may be maintained in the whole section of the control other than a lock up section of an engine clutch.

In accordance with another exemplary embodiment of the present invention, an apparatus for preventing a shut down in limp-home driving may include: a hybrid starter generator (HSG); a power converter configured to perform a constant voltage control for a control of the HSG; a hybrid control unit (HCU) configured to decelerate a vehicle speed in the limp-home driving and compare a current engine RPM with a preset engine RPM to shift a control right from the constant voltage control to a diode rectifying voltage control; and an inverter configured to perform the diode rectifying voltage control to generate a counter electromotive force for a supply power supply of an oil pump unit (OPU).

The HCU may be configured to perform an interlocking control between the constant voltage control and the diode rectifying voltage control of the vehicle during the limp-home driving. A constant voltage control condition for performing the constant voltage control may include adjusting the current engine RPM to be equal to or less than an engine idle RPM, equal to or less than an engine clutch input RPM value, and may be a value equal to or greater than the preset engine RPM which is a sum of a lowest allowable engine RPM during the diode rectifying voltage control.

When the HCU satisfies the constant voltage control condition during the diode rectifying voltage control, the constant voltage control may be repeated. Criteria for shifting the constant voltage control to the diode rectifying voltage control may be defined based on characteristics of the vehicle.

In accordance with still another exemplary embodiment of the present invention, a method for preventing a shut down in limp-home driving may include: operating, by an HCU, a vehicle by dualizing a driving of the vehicle into a normal driving control and a limp-home driving control; decelerating, by the HCU, a vehicle speed as the vehicle is transitioned from the normal driving control to the limp-home driving control; performing a control right shift on an ECU by confirming, by the HCU, a status of an engine clutch; comparing, by the ECU, a current engine RPM with a targeted engine RPM depending on the control right shift; and operating, by the ECU, an engine to adjust the current engine RPM to reach the targeted engine RPM based on the comparison. The operating of the engine may include increasing, by the ECU, the current engine RPM by fuel injection when the current engine RPM is less than the targeted engine RPM.

BRIEF DESCRIPTION OF THE DRAWINGS

FIG. 4 is an exemplary flow chart illustrating a process of preventing a shut down by an interlocking control of a constant voltage control and a diode rectifying voltage control according to another exemplary embodiment of the present invention.

DETAILED DESCRIPTION

Figure 1:
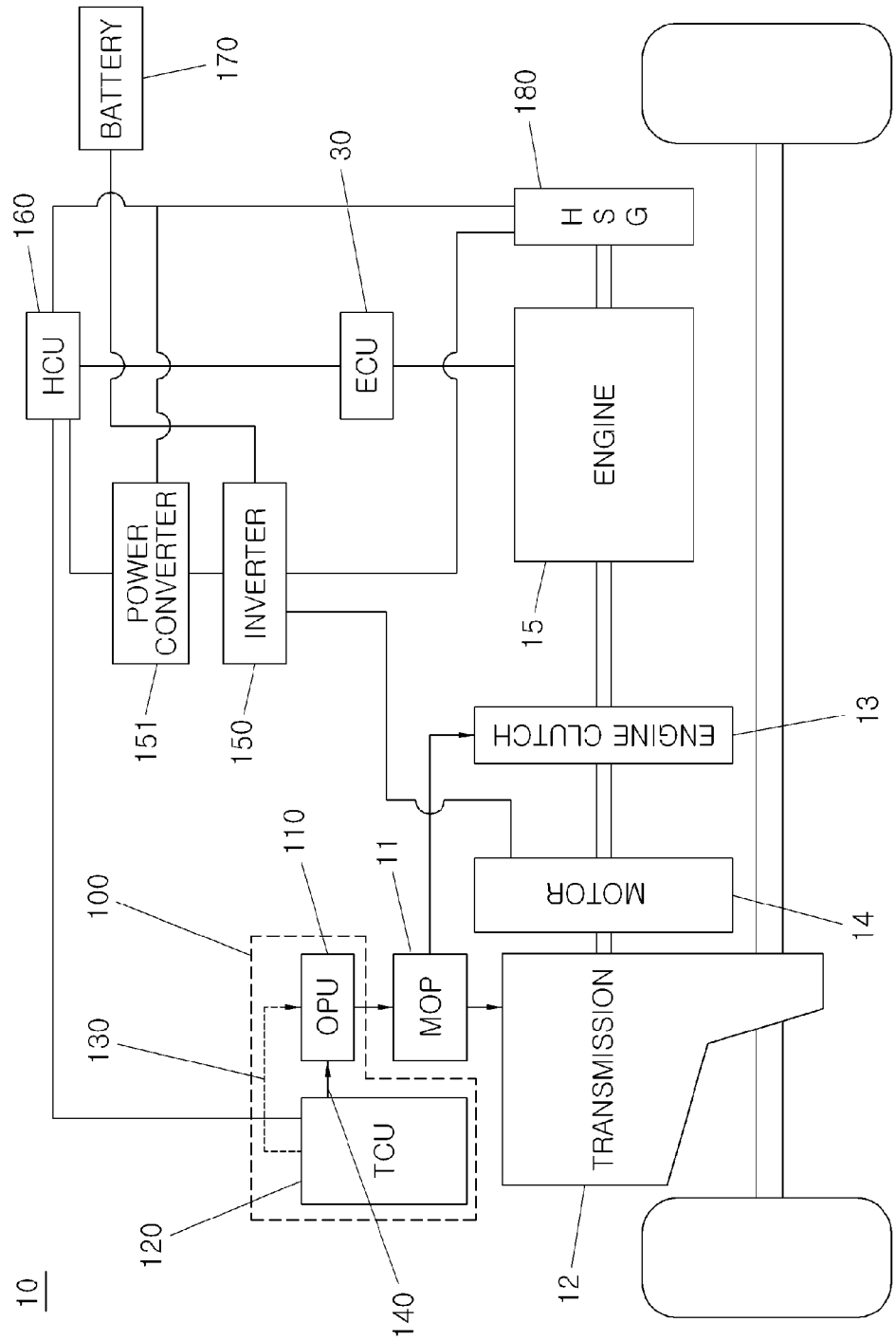
FIG. 1 is an exemplary block diagram of a configuration of an apparatus for preventing a shut down in limp-home driving according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention.

Throughout the accompanying drawings, the same reference numerals will be used to describe the same components. Terms used in the specification, 'first', 'second', etc., may be used to describe various components, but the components are not to be interpreted to be limited to the terms. The terms are used to distinguish one component from another component. Therefore, the first component may be referred to as the second component, and the second component may be referred to as the first component. The term 'and/or' includes a combination of a plurality of items or any one of a plurality of terms.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

An apparatus and a method for preventing a shut down in limp-home driving according to exemplary embodiments of the present invention will be described in detail with reference to the accompanying drawings.

FIG. 1 is an exemplary block diagram of a configuration of an apparatus for preventing a shut down in limp-home driving according to an exemplary embodiment of the present invention. Referring to FIG. 1, an apparatus 10 for preventing a shut down may include an engine 15, an engine clutch 13, a motor 14, a transmission 12, a mechanical oil pump (MOP) 11, an engine control unit 30, an oil pump control system 100, an inverter 150, a hybrid control unit 160, a power converter 151, a battery 170, a hybrid starter generator 180, and the like. Notably, the engine control unit (ECU) and the hybrid control unit (HCU) may be operated by a single controller. Additionally, the HCU may be configured to operate the elements of the apparatus.

As illustrated in FIG. 1, the oil pump control system 100 may include an oil pump unit (OPU) 110 configured to be electrically connected to the MOP 11 to operate the MOP 11 and a transmission control unit (TCU) 120 configured to apply a control signal to the OPU 110. The TCU 120 may be configured to determine the control signal for operating the MOP 11 based on a driving status of the vehicle and a driver demand and transmit the control signal to the OPU 110 via controller area network (CAN) 130 communication.

The OPU 110 may then be configured to receive the control signal to adjust an operation speed of the MOP 11 based on the control signal and the MOP 11 may be configured to supply a hydraulic fluid required for the transmission 12 and the engine clutch 13 based on the control of the OPU 110. Further, the MOP 11 may be an electric oil pump (EOP). The OPU 110 may be configured to transmit an operation speed of the MOP 11 to the TCU 120 via the CAN 130 communication. The TCU 120 may then be configured to receive an operation speed of the MOP 11 transmitted via the OPU 110 and determine a control signal for operating the MOP 11 based on the received operation speed.

In other words, the OPU 110 and the TCU 120 may be transmitted and received to and from each other based on an operation speed signal of the MOP 11 and a control signal for operating the same via the CAN 130 communication. When a failure occurs in the CAN 130 communication, the OPU 110 and the TCU 120 may not be capable of transmitting and receiving to and from each other by the CAN 130 communication. However, the OPU 110 may be electrically connected to the TCU 120 by a hard wire 140 and thus, the OPU 110 and the TCU 120 may be configured to transmit and receive a pulse width modulation (hereinafter, referred to as "PWM") signal via a hard wire 140.

As described above, when a failure occurs in the CAN 130 communication, the TCU 120 may be configured to determine the control signal for operating the MOP 11 and transmit the PWM control signal obtained by performing PWM on the control signal to the OPU 110 via the hard wire 140. The OPU 110 may then be configured to receive the PWM control signal to adjust the operation speed of the MOP 11 based on the PWM control signal and the MOP 11 may be configured to supply the hydraulic fluid required for the transmission 12 and the engine clutch 13 based on the control of the OPU 110. Accordingly, the oil pump control system 100 may be configured to operate the MOP 11 based on the signal received via the hard wire 140 by which the OPU 110 and the TCU 120 may be electrically connected to each other, even though the CAN 130 communication fails.

Furthermore, the engine may be operated as a first driving source in a hybrid electric vehicle and starting thereof may be turned on and off based on a driving mode and a driving situation. The engine 15 may be started off in an electric vehicle (EV) mode and started on in a hybrid electric vehicle (HEV) and the starting of the engine 15 may be turned on and off based on performance of an HSG function.

The HSG 180 may be configured to execute the turning on and off of the starting of the engine 15 based on the performance of the HSG function and may be operated as a power generator when an additional output is generated in the state in which the engine 15 starts on to generate a counter electromotive force. The counter electromotive force may be charged in the battery 170 through the inverter 150. The engine clutch 13 may be mounted between the engine 15 and the motor 14 to cut off a power transfer between the engine 15 and the motor 14. Generally, as the engine clutch 13, a wet clutch may be used.

In the hybrid electric vehicle, the motor 14 may be operated as a second driving source and may be driven by a 3-phase alternating current supplied from the inverter 150 to deliver an output torque to the transmission 12. Further, the motor 14 may be operated as the power generator during deceleration to generate the counter electromotive force and the generated counter electromotive force may be charged in the battery 170 through the inverter 150.

The battery 170 may be configured of battery cells connected in series and/or in parallel, in which the battery cell may be a high voltage battery for an electric vehicle such as a nickel metal battery, a lithium ion batter, and a lithium polymer battery. Generally, the high voltage battery is a battery used as a power source which moves the electric vehicle, which means a high voltage battery of about 100 V or greater. However, the exemplary embodiment of the present invention is not limited thereto, and therefore a low voltage battery may be used.

For the transmission 12, an auto transmission or a continuously variable transmission may be applied and a shift ratio of the transmission 12 may be adjusted based on a torque required for driving and a driving situation. The transmission 12 may be configured to output the output torque, summed and applied through the engine clutch 13 based on the driving mode, at the adjusted shift ratio and transfer the output torque to the driving wheel, to thus drive the vehicle.

The HCU 160 may be an uppermost controller and may be configured to execute the general operation of the system based on the driving of the hybrid electric vehicle. In particular, the vehicle may be operated by dualizing the driving of the vehicle into the normal driving control and the limp-home driving control. When the driving of the vehicle is the limp-home driving control, the vehicle speed may be decreased and a control right shift may be performed based on the status of the engine clutch 13.

In particular, the limp-home means a safe function of implementing minimum driving of a vehicle even when a problem of performance and a sensor operation arises. In other words, the limp-home means a state in which the vehicle is driven by an engine and a transmission while stopping the use of a motor and a hybrid starter generator (HSG) in a state in which power of a battery is cut off.

Generally, a feature of the structure of the transmission mounted electric device (TMED) is that the engine 15 may be connected to the HSG 180 at a ratio of about 1:2.5. Therefore, when the vehicle stops and when the engine 15 keeps starting up, the vehicle may be driven with the counter electromotive force by the rotation of the HSG 180. Further, the counter electromotive force of the motor 14 may be used during the driving of the vehicle. The counter electromotive force may be rectified from the diode (not illustrated) inside the inverter 150 by the rotation of the motor 14 and/or the HSG 180 and may be formed in a large capacity input capacitor of the inverter (not illustrated).

The formed counter electromotive force may be used as a supply power of the OPU 110. Further, the constant voltage (e.g., high voltage) may be generated by the inverter PWM control and thus even the power converter 151 which is a controller for battery charging may be driven. The power converter 151 may be a low voltage direct current-direct current (DC-DC) converter (LDC), and the like. However, to drive the power converter 151 using the OPU 110 or the constant voltage control in the vehicle, there may be a problem of applying the driving simply using the counter electromotive force to the vehicle. Therefore, the diode rectifying voltage control or the constant voltage control uses the counter electromotive force generated through the HSG 180 or the motor 14. Continuously referring to FIG. 1, the engine control unit (ECU) 30 may be configured to compare the current engine RPM with the targeted engine RPM based on the control right shift to operate the engine to adjust the engine RPM to reach the targeted engine RPM.

Figure 2:
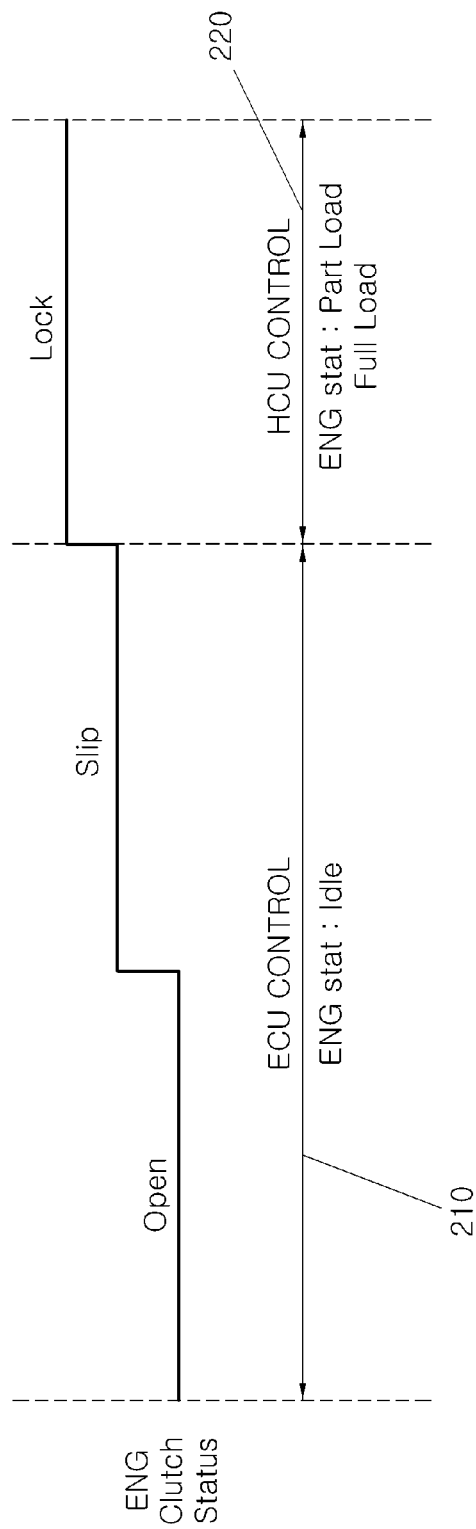
FIG. 2 is an exemplary diagram of a driving of a vehicle performed by dualizing an engine clutch control shift according to an exemplary embodiment of the present invention.

FIG. 2 is an exemplary diagram of a driving of a vehicle performed by dualizing an engine clutch control shift according to an exemplary embodiment of the present invention. Referring to FIG. 2, the whole section may be configured of an ECU control section 210 and an HCU control section 220. In other words, the status of the engine 15 (FIG. 1) in the ECU control section 210 may be in an idle status and the engine idle RPM may be maintained. In this case, an open status of the engine clutch 13 (FIG. 1) may be in a slip status.

Figure 3:
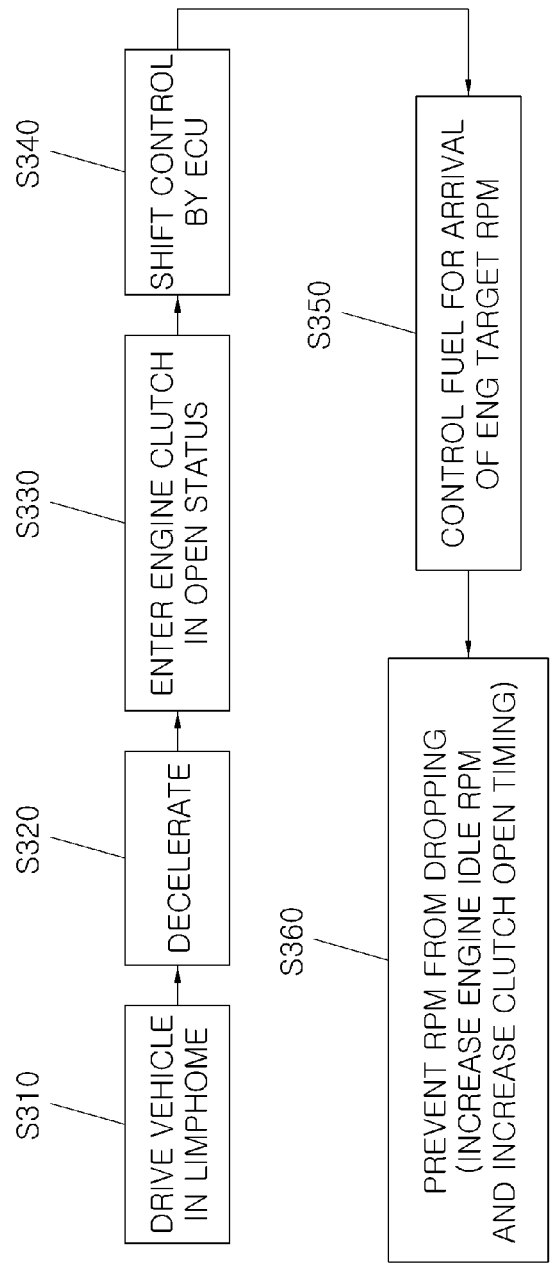
FIG. 3 is an exemplary flow chart illustrating a process of preventing a shut down by engine clutch control dualization as illustrated in FIG. 2 according to an exemplary embodiment of the present invention.

FIG. 3 is an exemplary flow chart illustrating a process of preventing a shut down by engine clutch control dualization as illustrated in FIG. 2. Referring to FIG. 3, the vehicle may be operated by being dualized into the normal driving control and the limp-home driving control. Therefore, as the vehicle transitions from the normal driving control to the limp-home driving control, the HCU 160 (FIG. 1) may be configured to decrease or reduce the vehicle speed (steps S310 and S320).

After the speed reduction, the HCU 160 may be configured to determine the status of the engine clutch 13 (FIG. 1) (step S330). In other words, whether the current status of the engine clutch 13 is in the open status or the slip status may be determined. In response to determining that the current status is in the open status or the slip status, the HCU 160 may be configured to perform the control right shift for the driving control of the engine 15 (FIG. 1) on the ECU 30 (FIG. 1) (step S340).

The ECU 30 may be configured to compare the current engine RPM with the targeted engine RPM based on the control right shift. Accordingly, the ECU 30 may be configured to operate the engine 15 to adjust the current engine RPM to reach the targeted engine RPM (steps S350 and S360). In other words, when the control right is shifted to the ECU 30, the ECU 30 may be configured to increase the current engine RPM by fuel injection when the current engine RPM reaches a lower RPM than the targeted engine RPM which is an engine idle RPM.

Additionally, the shutdown of the vehicle may be more robustly prevented by performing the dualization into; the engine idle RPM and the open timing of the engine clutch 13 during the limp-home driving. In particular, the targeted engine RPM may be preset in the HCU 160 and thus may be a designated value. In other words, the targeted engine RPM may be a preset value determined by programming.

FIG. 4 is an exemplar flow chart illustrating a process of preventing a shut down by an interlocking control of a constant voltage control and a diode rectifying voltage control according to another exemplary embodiment of the present invention. Referring to FIG. 4, the power converter 151 (FIG. 1) may be configured to perform the constant voltage control to operate the HSG 180 (FIG. 1). The vehicle may be in the limp-home driving status while the constant voltage control is performed and the HCU 180 may be configured to reduce the vehicle speed in the limp-home driving (steps S410 and S420).

Based on the speed reduce, the HCU 180 may be configured to compare the current engine RPM with the preset engine RPM (step S430). When the current engine RPM is less than the preset engine RPM, the HCU 180 may be configured to shift the control right from the constant voltage control to the diode rectifying voltage control (step S440).

Therefore, the inverter 151 may be configured to perform the diode rectifying voltage control to generate the counter electromotive force for the supply power of the oil pump unit (OPU) (step S440). In other words, to implement the optimal driving using the counter electromotive force in the vehicle, the interlocking control of the diode rectifying control and the constant voltage control is required and the control conditions may be added to implement the interlocking control.

Further, whether the constant voltage control condition again performing the rectifying voltage control during the diode rectifying voltage control is satisfied may be determined (step S450). The constant control condition depends on whether the current engine RPM is equal to or less than a preset engine RPM. The current engine RPM is a sum of a value which is equal to or less than the engine idle RPM, a value which is equal to or less than the engine clutch input RPM value, and a value which is equal to or greater than the lowest allowable engine RPM at the time of the diode rectifying voltage control.

Additionally, criteria of the constant voltage control condition may be defined based on the characteristics of the vehicle. In other words, an example of the characteristics of the vehicle may include the engine RPM, the counter electromotive generation condition of the HSG, and the like since the engine RPM for the vehicle is different and the counter electromotive force generation condition of the HSG is also different.

When the current engine RPM is less than the preset engine RPM, the diode rectifying control may be performed. Moreover, when the current engine RPM is greater than the preset engine RPM, the diode rectifying voltage control may be repeated. Further, in the constant voltage control condition, a substantially constant margin value may be added.

The constant voltage control condition maximizes the constant voltage control region to implement the vehicle driving. Further, in the diode rectifying voltage control, when the constant voltage control condition is satisfied, the control may again be shifted to drive the power converter 151 (FIG. 1). Therefore, as the confirmation result of step S450, when the constant voltage condition is satisfied, is the control may be shifted to the constant voltage control during the diode rectifying voltage control (step S460).

According to the exemplary embodiments of the present invention, it may be possible to prevent the shut down of the vehicle by preventing the engine RPM from decreasing, when the whole section except for the engine (ENG) clutch lock up is shifted to the engine (ENG) idle control during the limp-home driving in the state in which the motor (M/R) is turned off by logically dualizing the driving of the vehicle into the high voltage oil pump into the normal driving and the limp-home driving.

Further, according to the exemplary embodiments of the present invention, it may be possible to prevent the shut down of the vehicle which may occur when the constant voltage control of the hybrid starter generator (HSG) is maintained and continuously maintain the limp-home driving, by performing the interlocking control of the constant voltage control and the diode rectifying voltage control.

The foregoing exemplary embodiments are merely examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. An apparatus for preventing a shut down in limp-home driving, comprising:
    an engine clutch;
    a hybrid control unit (HCU) configured to operate a vehicle by dualizing a driving of the vehicle into a normal driving control and a limp-home driving control and when the driving of the vehicle is in the limp-home driving control, reduce a vehicle speed and shift a control right based on a status of the engine clutch; and
    an engine control unit (ECU) configured to compare a current engine revolution per minute (RPM) with a targeted engine RPM when the shift of the control right occurs, and to operate the engine to adjust the engine RPM to reach the targeted engine RPM to satisfy minimum voltage for a power supply of a high voltage oil pump unit (OPU) by operating a hybrid starter generator (HSG) connected to the engine control unit via a connecting means when the engine is in an idle state,
    wherein the targeted engine RPM and an engine idle RPM are preset by the hybrid control unit, and the engine idle RPM is maintained in an open status or a slip status of the engine clutch, and
    wherein in the limp-home driving control, a high voltage battery is cut off preventing the OPU from being supplied with high voltages.

2. The apparatus of claim 1, wherein the targeted engine RPM is a value designated by the HCU.

3. The apparatus of claim 1, wherein the ECU is configured to increase the current engine RPM by fuel injection when the current engine RPM is less than the targeted engine RPM.

4. The apparatus of claim 1, wherein the HCU is configured to increase an open timing of the engine clutch based on an increase in the current engine RPM.

5. An apparatus for preventing a shut down in limp-home driving, comprising:
    a hybrid starter generator (HSG);
    a hybrid control unit (HCU) configured to reduce a vehicle speed in the limp-home driving and compare a current engine RPM with a preset engine RPM to shift a control right in response to the comparison from a controller employing constant voltage control to a controller employing diode rectifying voltage control; and
    an inverter configured to perform the diode rectifying voltage control to generate a counter electromotive force to satisfy minimum voltage for a supply power of a high voltage oil pump unit (OPU) by operating the hybrid starter generator connected to the engine control unit via a connecting means,
    wherein the counter electromotive force is rectified from a diode inside the inverter and is formed in a large capacity input capacitor inside the inverter, and
    wherein in the limp-home driving control, a high voltage battery is cut off preventing the OPU from being supplied with high voltages.

6. The apparatus of claim 5, wherein the HCU is configured as an interlocking control between the constant voltage control and the diode rectifying voltage control of the vehicle during the limp-home driving.

7. The apparatus of claim 5, wherein a constant voltage control condition for performing the constant voltage control depends on whether the current engine RPM is equal to or less than the preset engine RPM and the current engine RPM is a sum of a value that is equal to or less than an engine idle RPM, a value that is equal to or less than an engine clutch input RPM value, and a value that is equal to or greater than a lowest allowable engine RPM during the diode rectifying voltage control.

8. The apparatus of claim 7, wherein when the HCU satisfies the constant voltage control condition during the diode rectifying voltage control, the constant voltage control is repeated.

9. The apparatus of claim 5, wherein criteria for shifting the constant voltage control to the diode rectifying voltage control are defined based on characteristics of the vehicle.

10. A method for preventing a shut down in limp-home driving, comprising:
    operating, by a hybrid control unit (HUC), a vehicle by dualizing a driving of the vehicle into a normal driving control and a limp-home driving control;
    reducing, by the HCU, a vehicle speed as the vehicle transitions from the normal driving control to the limp-home driving control;
    shifting, by the HCU, a control right on an engine control unit (ECU) based on a determined status of an engine clutch;
    comparing, by the ECU, a current engine revolutions per minute (RPM) with a targeted engine RPM after the shift of the control right; and
    operating, by the ECU, an engine to adjust the current engine RPM to reach the targeted engine RPM based on the comparison to satisfy minimum voltage for a power supply of a high voltage oil pump unit (OPU) by operating a hybrid starter generator (HSG) connected to the engine control unit via a connecting means when the engine is in an idle state,
    wherein the targeted engine RPM and an engine idle RPM are preset by the hybrid control unit and the engine idle RPM is maintained during open status or a slip status of the engine clutch, and
    wherein in the limp-home driving control, a high voltage battery is cut off preventing the OPU from being supplied with high voltages.

11. The method of claim 10, wherein the targeted engine RPM is a value designated by the HCU.

12. The method of claim 10, wherein the operating of the engine includes increasing, by the ECU, the current engine RPM by fuel injection when the current engine RPM is less than the targeted engine RPM.

13. The method of claim 10, wherein the HCU is configured to increase an open timing of the engine clutch based on an increase in the current engine RPM.

* * * * *